United States Patent
Robert et al.

(10) Patent No.: US 12,231,620 B2
(45) Date of Patent: Feb. 18, 2025

(54) SPATIAL PREDICTOR SCAN ORDER

(71) Applicant: InterDigital CE Patent Holdings, SAS, Paris (FR)

(72) Inventors: Antoine Robert, Cesson-Sevigne (FR); Franck Galpin, Cesson-Sevigne (FR); Fabrice Leleannec, Betton (FR); Gagan Rath, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 284 days.

(21) Appl. No.: 17/772,061

(22) PCT Filed: Dec. 17, 2020

(86) PCT No.: PCT/EP2020/086692
§ 371 (c)(1),
(2) Date: Apr. 26, 2022

(87) PCT Pub. No.: WO2021/130097
PCT Pub. Date: Jul. 1, 2021

(65) Prior Publication Data
US 2022/0377318 A1    Nov. 24, 2022

(30) Foreign Application Priority Data
Dec. 24, 2019   (EP) ................................. 19306770

(51) Int. Cl.
*H04N 19/105* (2014.01)
*H04N 19/129* (2014.01)
*H04N 19/176* (2014.01)

(52) U.S. Cl.
CPC ......... *H04N 19/105* (2014.11); *H04N 19/129* (2014.11); *H04N 19/176* (2014.11)

(58) Field of Classification Search
CPC ... H04N 19/105; H04N 19/129; H04N 19/176
(Continued)

(56) References Cited

U.S. PATENT DOCUMENTS 9,674,530 B1 *  6/2017  Bultje .................. H04N 19/157
10,771,811 B2 *  9/2020  Liu ....................... H04N 19/105
(Continued)

FOREIGN PATENT DOCUMENTS

WO    WO2020182165 A1    9/2020

OTHER PUBLICATIONS

Wang et al. ("Non-CE4: Construction of Spatial Merge Candidates" JVET Oct. 2019) (Year: 2019).*
(Continued)

*Primary Examiner* — Matthew David Kim
(74) *Attorney, Agent, or Firm* — Xiaoan Lu

(57) ABSTRACT

To encode a coding unit in the inter modes, there exist multiple inter modes that signal the motion information using a Motion Vector Predictor (MW) list. The MW lists for different coding modes include spatial predictors. In one embodiment, for all coding modes that use MVP lists, the top spatial predictor is first added to the motion vector predictor list before the left spatial predictor. In another embodiment, a subset of coding modes adds the top spatial predictor before the left spatial predictor, and another subset of coding modes adds the left spatial predictor before the top spatial predictor. For example, all merge modes add the top spatial predictor first, and all AMVP modes add the left spatial predictor first. In another example, all non-sub-block modes add the top spatial predictor first, and all sub-block modes add the left spatial predictor first.

8 Claims, 8 Drawing Sheets

(58) Field of Classification Search
USPC .................................................. 375/240.02
See application file for complete search history.

(56) References Cited

U.S. PATENT DOCUMENTS

| | | | | |
|---|---|---|---|---|
| 2012/0183070 | A1* | 7/2012 | Pateux | H04N 19/109 |
| | | | | 375/E7.125 |
| 2016/0182913 | A1* | 6/2016 | Joshi | H04N 19/139 |
| | | | | 375/240.08 |
| 2017/0223379 | A1* | 8/2017 | Chuang | H04N 19/513 |
| 2017/0332095 | A1* | 11/2017 | Zou | H04N 19/44 |
| 2021/0044797 | A1* | 2/2021 | Lee | H04N 19/70 |
| 2021/0195171 | A1* | 6/2021 | Rath | H04N 19/176 |
| 2022/0159277 | A1* | 5/2022 | Urban | H04N 19/132 |
| 2022/0272375 | A1* | 8/2022 | Xiu | H04N 19/176 |
| 2022/0417518 | A1* | 12/2022 | Koo | H04N 19/119 |
| 2023/0353789 | A1* | 11/2023 | Nandan | H04N 19/423 |

OTHER PUBLICATIONS

Xu et al. ("Non-CE4: On Spatial Candidate List Construction" JVET Mar. 2019) (Year: 2019).*

Xu et al., "Non-CE4: On spatial candidate list construction", Document: JVET-N0165-v3, Joint Video Experts Team (JVET) of ITU-T SG 16 WP 3 and ISO/IEC JTC 1/SC 29/WG 11, 14th Meeting: Geneva, CH, pp. 1-6, Mar. 19-27, 2019.

Chen et al., "Algorithm description for Versatile Video Coding and Test Model 5 (VTM 5)", Document: JVET-N1002-v2, Joint Video Experts Team (JVET) of ITU-T SG 16 WP 3 and ISO/IEC JTC 1/SC 29/WG 11, 14th Meeting, Geneva, CH, pp. 1-76, Mar. 19-27, 2019.

Xu et al., "Candidate list reordering", Document: JVET-K00650-v4, Joint Video Experts Team (JVET) of ITU-T SG16 WP 3 and ISO/IEC JTC 1/SC 29/WG 11, 11th Meeting: Ljubjana, SI, pp. 1-6, Jul. 10-18, 2018.

Wang et al., "Non-CE4: Construction of spatial merge candidates", Document: JVET-P0325-v1, Joint Video Experts Team (JVET) of ITU-T SG 16 WP 3 and ISO/IEC JTC 1/SC 29/WG 11, 16th Meeting: Geneva, CH, pp. 1-3, Oct. 1-11, 2019.

Chen et al., "Algorithm description for Versatile Video Coding and Test Model 6 (VTM 6)", Document: JVET-O2002-v2, Joint Video Experts Team (JVET) of ITU-T SG 16 WP 3 and ISO/IEC JTC 1/SC 29/WG 11, 15th Meeting: Gothenburg, SE, pp. 1-87, Jul. 3-12, 2019.

Robert et al., "Non-CE4: Extension of JVET-P0325", Document: JVET-Q0601-v2, Joint Video Experts Team (JVET) of ITU-T SG 16 WP 3 and ISO/IEC JTC 1/SC 29/WG 11, 17th Meeting: Brussels, BE, pp. 1-8, Jan. 7-17, 2020.

Bross et.al., "Versatile Video Coding (Draft 7)", Document: JVET-P2001-vE, Joint Video Experts Team (JVET) of ITU-T SG 16 WP 3 and ISO/IEC JTC 1/SC 29/WG 11, 16th Meeting: Geneva, CH, pp. 1-488, Oct. 1-11, 2019.

* cited by examiner

SPATIAL PREDICTOR SCAN ORDER

This application claims the benefit, under 35 U.S.C. § 371 of International Application No. PCT/EP2020/086692, filed Dec. 17, 2020, which was published on Jul. 1, 2021, which claims the benefit of European Patent Application No. EP19306770.9 filed Dec. 24, 2019.

TECHNICAL FIELD

The present embodiments generally relate to a method and an apparatus for video encoding or decoding, and more particularly, to a method and an apparatus for adjusting the motion vector predictors in the predictor list.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video decoding is provided, comprising: generating a list of motion vector predictors for a block of a picture in a video sequence, wherein said block is to be decoded by using one of a plurality of coding modes, wherein said list of motion vector predictors includes a plurality of spatial predictors, wherein, for each of said plurality of coding modes, the first spatial predictor in said list is from a top neighboring block, and the second spatial predictor following the first spatial predictor is from a left neighboring block; and decoding a motion vector associated with said block based on said list of motion vector predictors.

According to another embodiment, a method of video encoding is provided, comprising: accessing a block of a picture in a video sequence; generating a list of motion vector predictors for said block, wherein said block is to be encoded by using one of a plurality of coding modes, wherein said list of motion vector predictors includes a plurality of spatial predictors, wherein, for each of said plurality of coding modes, the first spatial predictor in said list is from a top neighboring block, and the second spatial predictor following the first spatial predictor is from a left neighboring block; and encoding a motion vector associated with said block based on said list of motion vector predictors.

According to another embodiment, a method of video decoding is provided, comprising: generating a list of motion vector predictors for said block, wherein said block is to be decoded by using one of a plurality of coding modes, wherein said list of motion vector predictors includes a plurality of spatial predictors, wherein, for each of one or more merge modes in said plurality of coding modes, the first spatial predictor in said list is from a top neighboring block, and the second spatial predictor following the first spatial predictor is from a left neighboring block, and wherein, for each of one or more AMVP modes in said plurality of coding modes, the first spatial predictor in said list is from a left neighboring block, and the second spatial predictor following the first spatial predictor is from a top neighboring block; and decoding a motion vector associated with said block based on said list of motion vector predictors.

According to another embodiment, a method of video encoding is provided, comprising: accessing a block of a picture in a video sequence; generating a list of motion vector predictors for said block, wherein said block is to be encoded by using one of a plurality of coding modes, wherein said list of motion vector predictors includes a plurality of spatial predictors, wherein, for each of one or more merge modes in said plurality of coding modes, the first spatial predictor in said list is from a top neighboring block, and the second spatial predictor following the first spatial predictor is from a left neighboring block, and wherein, for each of one or more AMVP modes in said plurality of coding modes, the first spatial predictor in said list is from a left neighboring block, and the second spatial predictor following the first spatial predictor is from a top neighboring block; and encoding a motion vector associated with said block based on said list of motion vector predictors.

According to another embodiment, a method of video decoding is provided, comprising: generating a list of motion vector predictors for said block, wherein said block is to be decoded by using one of a plurality of coding modes, wherein said list of motion vector predictors includes a plurality of spatial predictors, wherein, for each of one or more non-sub-block modes in said plurality of coding modes, the first spatial predictor in said list is from a top neighboring block, and the second spatial predictor following the first spatial predictor is from a left neighboring block, and wherein, for each of one or more sub-block modes in said plurality of coding modes, the first spatial predictor in said list is from a left neighboring block, and the second spatial predictor following the first spatial predictor is from a top neighboring block; and decoding a motion vector associated with said block based on said list of motion vector predictors.

According to another embodiment, a method of video encoding is provided, comprising: accessing a block of a picture in a video sequence; generating a list of motion vector predictors for said block, wherein said block is to be encoded by using one of a plurality of coding modes, wherein said list of motion vector predictors includes a plurality of spatial predictors, wherein, for each of one or more non-sub-block modes in said plurality of coding modes, the first spatial predictor in said list is from a top neighboring block, and the second spatial predictor following the first spatial predictor is from a left neighboring block, and wherein, for each of one or more sub-block modes in said plurality of coding modes, the first spatial predictor in said list is from a left neighboring block, and the second spatial predictor following the first spatial predictor is from a top neighboring block; and encoding a motion vector associated with said block based on said list of motion vector predictors.

According to another embodiment, an apparatus for video encoding is provided, wherein said apparatus comprising one or more processors are configured to: access a block of a picture in a video sequence; generate a list of motion vector predictors for said block, wherein said block is to be encoded by using one of a plurality of coding modes, wherein said list of motion vector predictors includes a plurality of spatial predictors, wherein, for each of said plurality of coding modes, the first spatial predictor in said list is from a top neighboring block, and the second spatial predictor following the first spatial predictor is from a left neighboring block; and encode a motion vector associated with said block based on said list of motion vector predictors.

According to another embodiment, an apparatus for video decoding is provided, wherein said apparatus comprising one or more processors are configured to: generate a list of motion vector predictors for a block of a picture in a video sequence, wherein said block is to be decoded by using one of a plurality of coding modes, wherein said list of motion vector predictors includes a plurality of spatial predictors, wherein, for each of said plurality of coding modes, the first spatial predictor in said list is from a top neighboring block, and the second spatial predictor following the first spatial predictor is from a left neighboring block; and decode a motion vector associated with said block based on said list of motion vector predictors.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
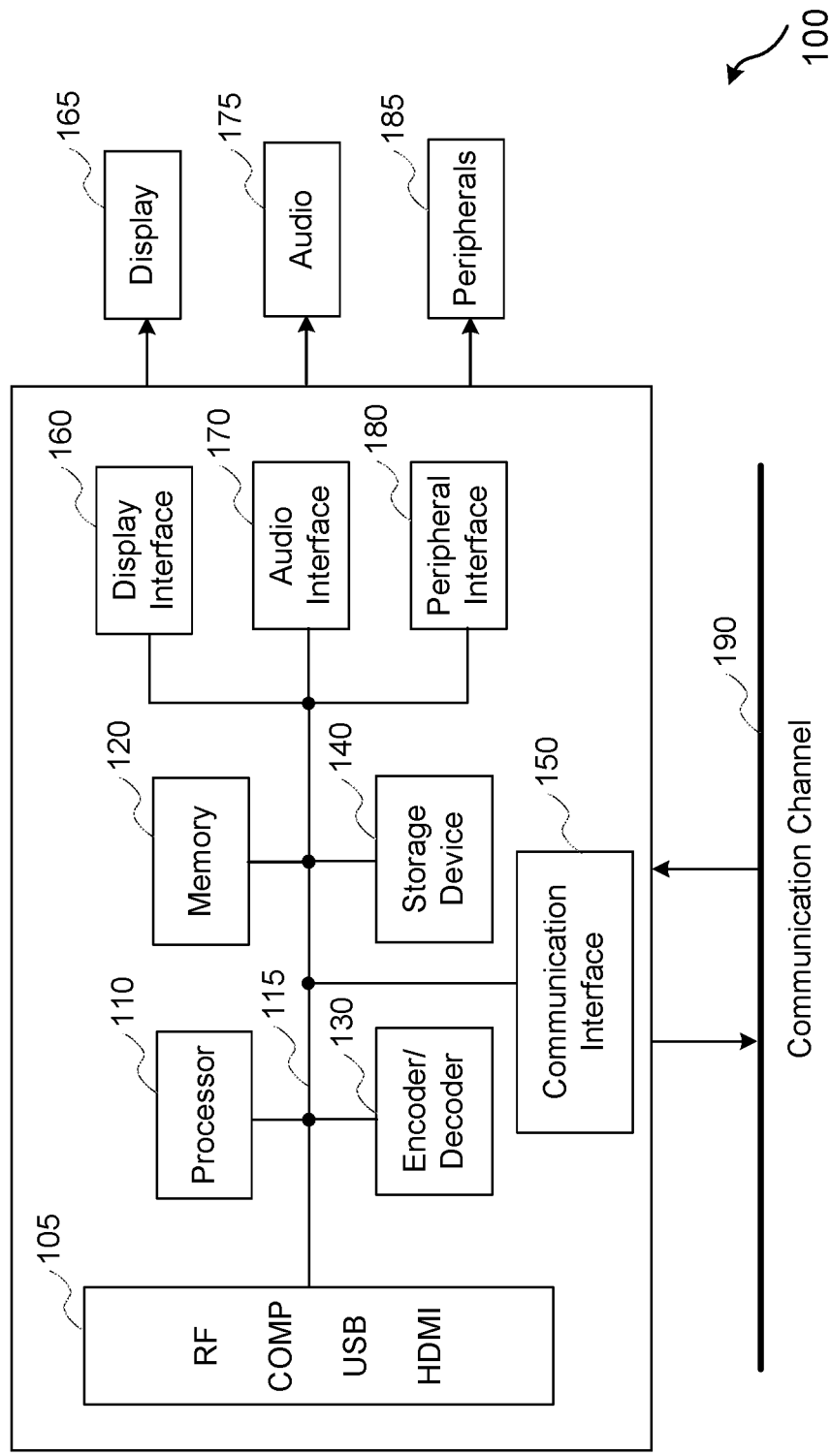
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
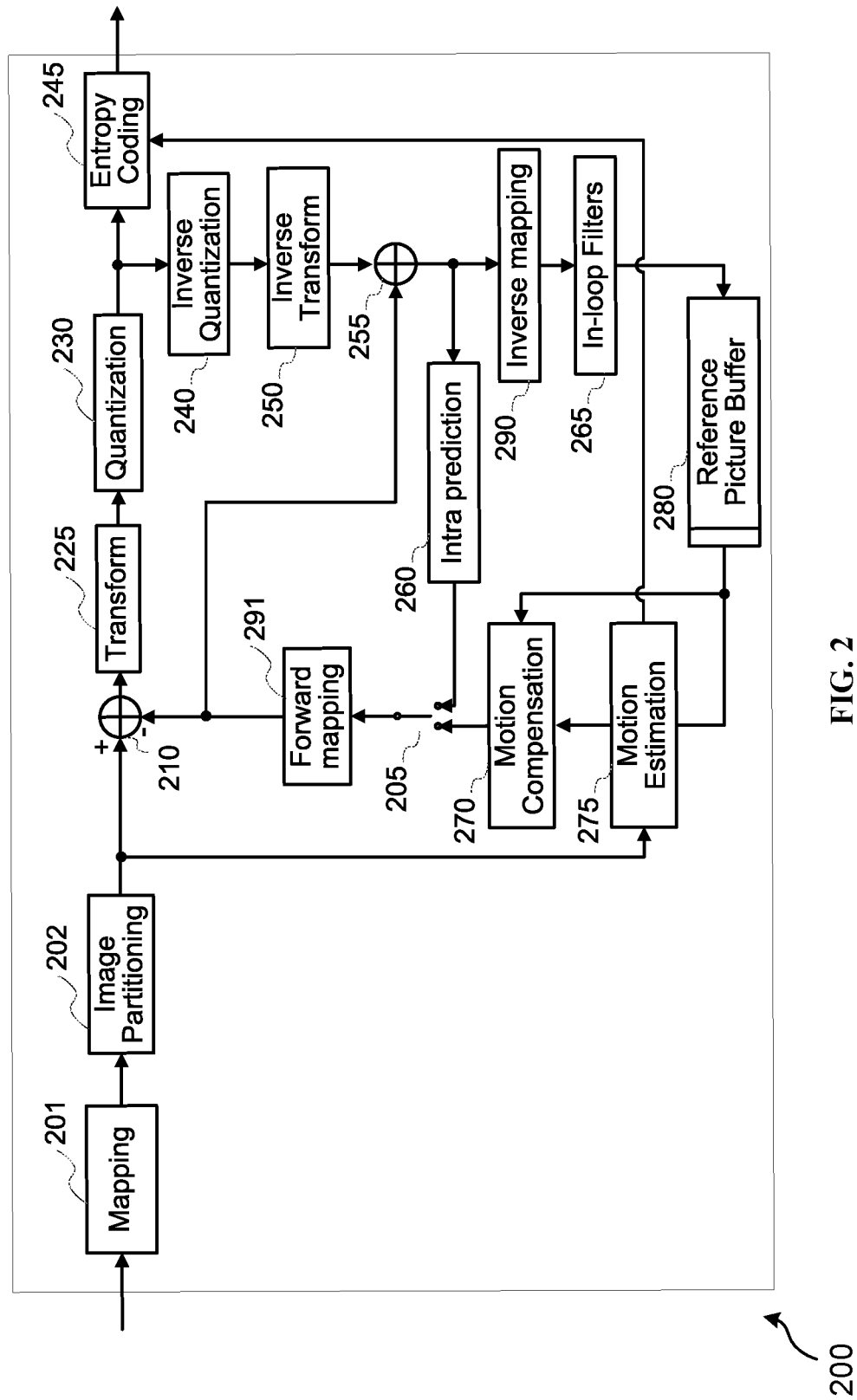
FIG. 2 illustrates a block diagram of an embodiment of a video encoder.

FIG. 2 illustrates an example of a video encoder 200, such as a VVC (Versatile Video Coding) encoder. In the present application, the terms "reconstructed" and "decoded" may be used interchangeably, the terms "encoded" or "coded" may be used interchangeably, and the terms "image", "picture" and "frame" may be used interchangeably. Usually, but not necessarily, the term "reconstructed" is used at the encoder side while "decoded" is used at the decoder side.

Before being encoded, the video sequence may go through pre-encoding processing, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The input signals are mapped (201). The mapping in 201 may correspond to the forward mapping in 291, or further includes other mappings for pre-processing. The picture to be encoded is processed in units of CUs (202). Each CU is encoded using either an intra or inter mode. When a CU is encoded in an intra mode, it performs intra prediction (260). In an inter mode, motion estimation (275) and compensation (270) are performed. The forward mapping (291) is applied to the predicted signals. The encoder decides (205) which one of the intra mode or inter mode to use for encoding the CU, and indicates the intra/inter decision by a prediction mode flag. Prediction residuals are calculated by subtracting (210) the mapped predicted block (from step 291) from the mapped original image block (from step 201).

The prediction residuals are then transformed (225) and quantized (230). The quantized transform coefficients, as well as motion vectors and other syntax elements, are entropy coded (245) to output a bitstream. The encoder may also skip the transform and apply quantization directly to the non-transformed residual signal. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. Inverse mapping (290) and in-loop filters (265) are applied to the reconstructed signal, for example, to perform deblocking/SAO (Sample Adaptive Offset) filtering to reduce encoding artifacts. The filtered image is stored at a reference picture buffer (280).

Figure 3:
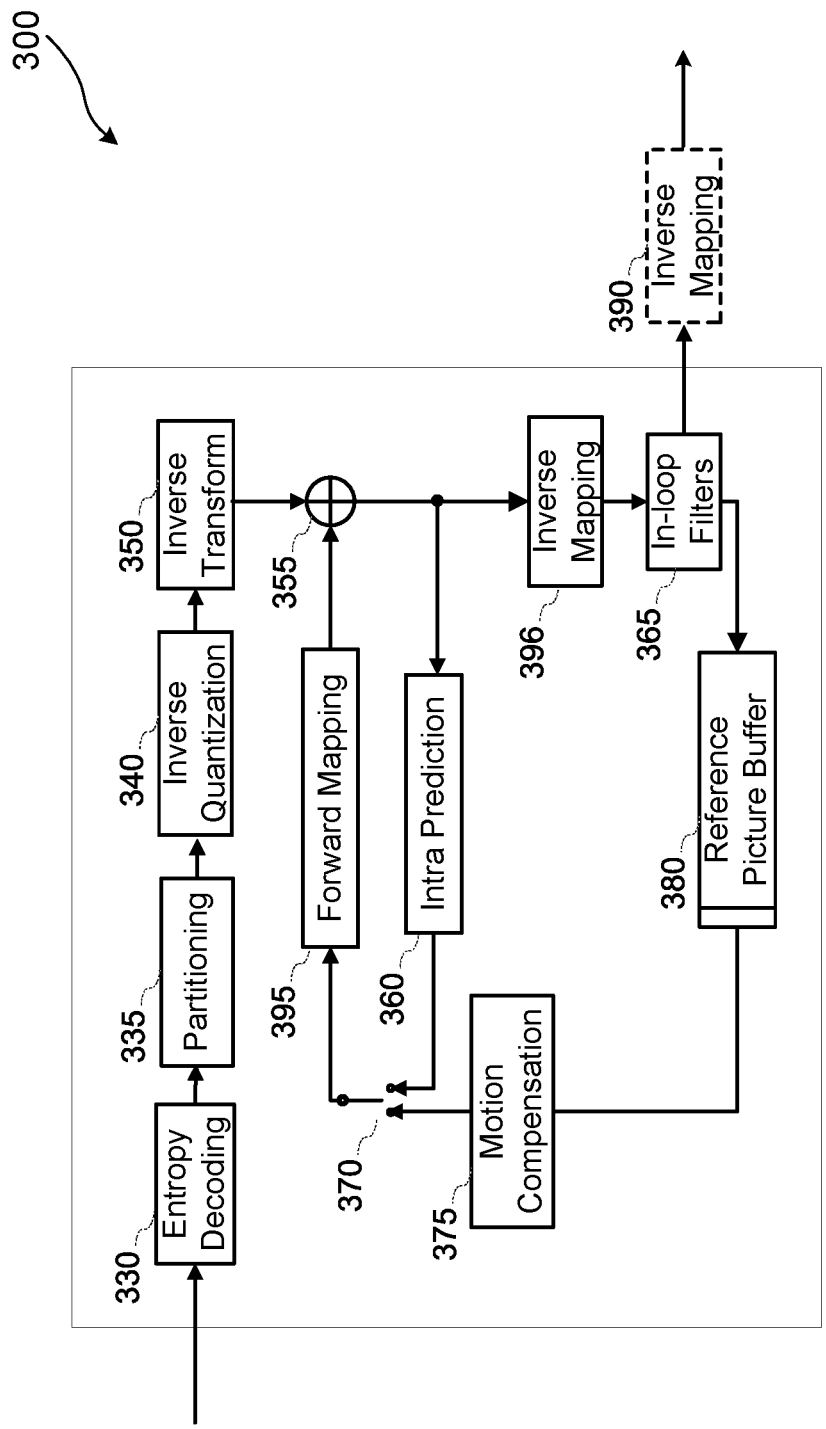
FIG. 3 illustrates a block diagram of an embodiment of a video decoder.

FIG. 3 illustrates a block diagram of an example of a video decoder 300, such as a VVC decoder. In the decoder 300, a bitstream is decoded by the decoder elements as described below. Video decoder 300 generally performs a decoding pass reciprocal to the encoding pass as described in FIG. 2, which performs video decoding as part of encoding video data.

In particular, the input of the decoder includes a video bitstream, which may be generated by video encoder 200. The bitstream is first entropy decoded (330) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (335) the picture into CTUs, and each CTU into CUs, according to the decoded picture partitioning information. The transform coefficients are de-quantized (340) and inverse transformed (350) to decode the prediction residuals.

Combining (355) the decoded prediction residuals and the predicted block, an image block is reconstructed. The predicted block may be obtained (370) from intra prediction (360) or motion-compensated prediction (i.e., inter prediction) (375). Also the forward mapping (395) is applied to the predicted signals. In case of bi-prediction, two motion compensated predictions may be combined with a weighted sum. Inverse mapping (396) and in-loop filters (365) are applied to the reconstructed signal. The filtered image is stored at a reference picture buffer (380).

The output from the in-loop filters may go through inverse mapping (390) that performs the inverse of the mapping process (201) performed in the pre-processing. The decoded picture can further go through other post-decoding processing, for example, an inverse color transform (e.g., conversion from YCbCr 4:2:0 to RGB 4:4:4). The post-decoding processing may use metadata derived in the pre-encoding processing and signaled in the bitstream.

Figure 4:
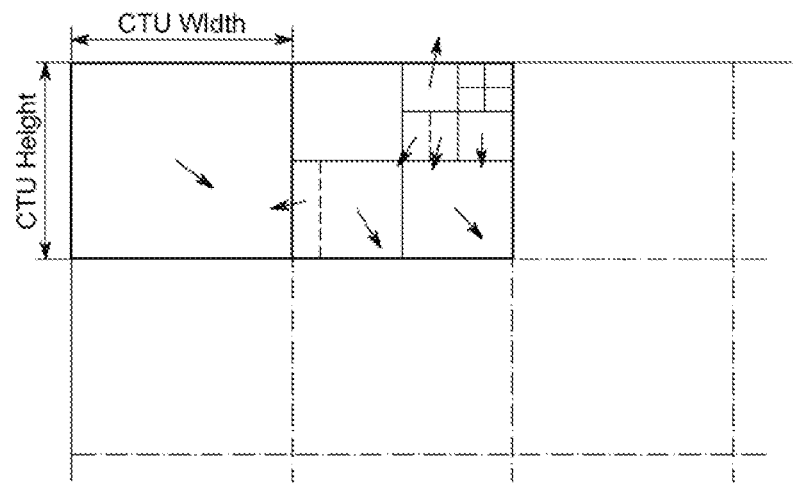
FIG. 4 illustrates an example of Coding Tree Unit (CTU) and Coding Tree (CT) concepts to represent a compressed HEVC picture.
Figure 5:
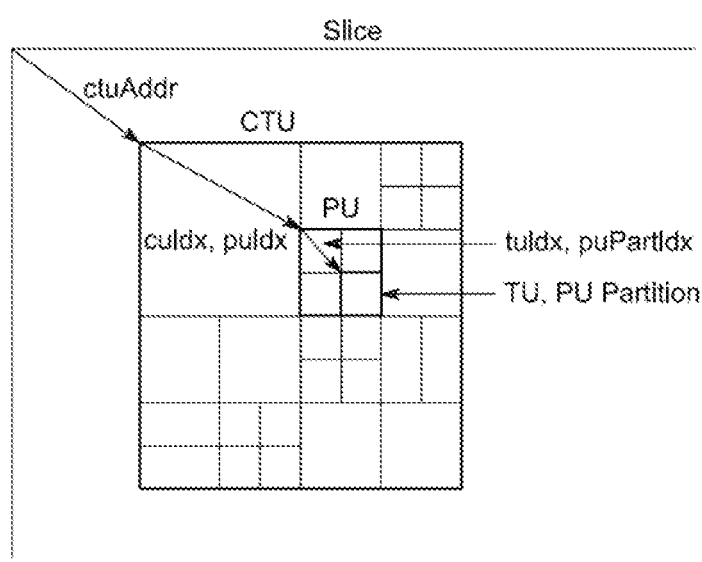
FIG. 5 illustrates an example of divisions of a Coding Tree Unit (CTU) into Coding Units (CUs), Prediction Units (PUs), and Transform Units (TUs).

In HEVC, motion compensated temporal prediction is employed to exploit the redundancy that exists between successive pictures of a video, where a motion vector is associated with each prediction unit (PU). Each CTU is represented by a Coding Tree in the compressed domain. This is a quad-tree division of the CTU, where each leaf is called a Coding Unit (CU) as illustrated in FIG. 4. Each CU is then given some Intra or Inter prediction parameters as prediction information. To do so, a CU may be spatially partitioned into one or more Prediction Units (PUs), each PU being assigned some prediction information. The Intra or Inter coding mode is assigned on the CU level. These concepts are further illustrated in FIG. 5.

New video compression tools in VVC include a Coding Tree Unit representation in the compressed domain, which can represent picture data in a more flexible way. In VVC, a quadtree with nested multi-type tree (MTT) using binary and ternary splits segmentation structure replaces the concepts of multiple partition unit types, i.e., VVC removes the separation of the CU, PU and TU concepts except in several special cases. In the VVC coding tree structure, a CU can have either a square or rectangular shape. A coding tree unit (CTU) is first partitioned by a quadtree structure. Then the quadtree leaf nodes can be further partitioned by a multi-type tree structure.

Figure 6:
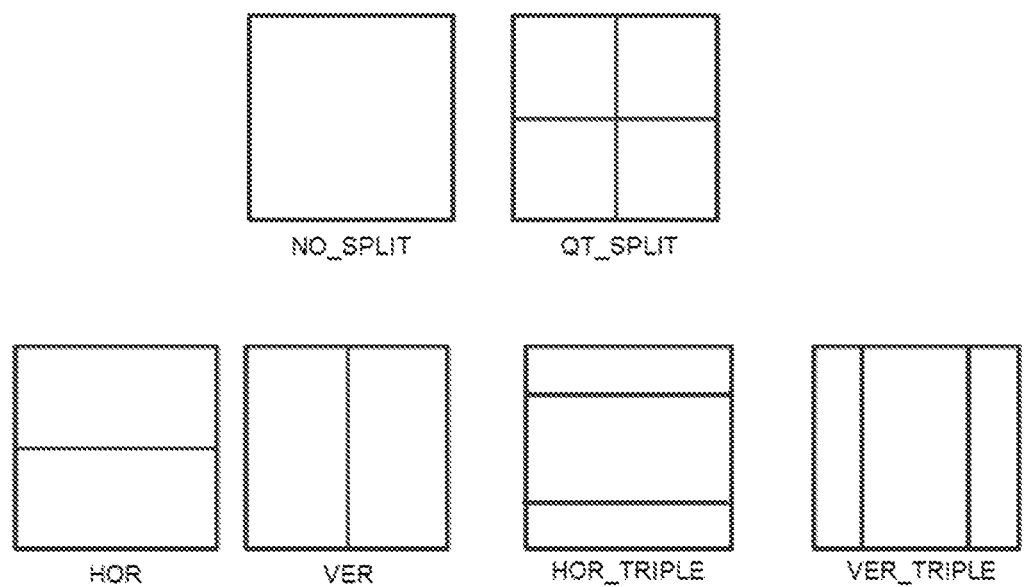
FIG. 6 illustrates the partitioning used in VVC.
Figure 7:
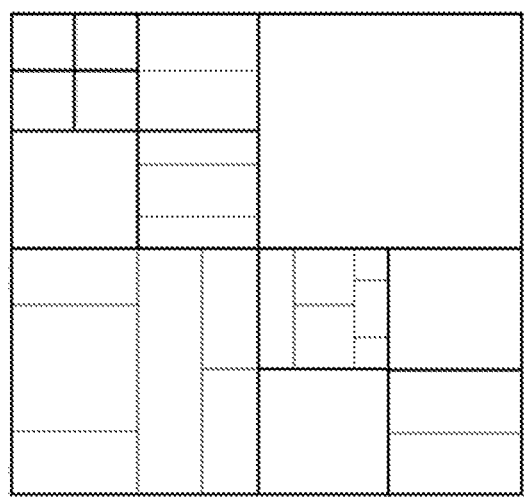
FIG. 7 illustrates an example of partitioning a picture with quadtree and binary/ternary tree in VVC.

In particular, the tree decomposition of a CTU is proceeded in different stages: first the CTU is split in a quadtree fashion, then each quadtree leaf can be further divided in a binary or ternary fashion. As shown in FIG. 6, there are four splitting types in multi-type tree structure, namely, vertical binary splitting (VER), horizontal binary splitting (HOR), vertical ternary splitting (VER_TRIPLE), and horizontal ternary splitting (HOR_TRIPLE). The HOR_TRIPLE or VER_TRIPLE splitting (horizontal or vertical triple tree splitting mode) consists in dividing a coding unit (CU) into 3 sub-coding-units (sub-CUs), with respective sizes equal to ¼, ½ and ¼ of the parent CU size in the direction of the considered spatial division. The multi-type tree leaf nodes are called coding units (CUs), and except in several special cases, this segmentation is used for prediction and transform processing without any further partitioning. An example of a CTU divided into multiple CUs with quadtree and ternary/binary tree coding block structure is shown in FIG. 7.

Predictor Lists in the VTM (VVC Test Model)

Figure 8:
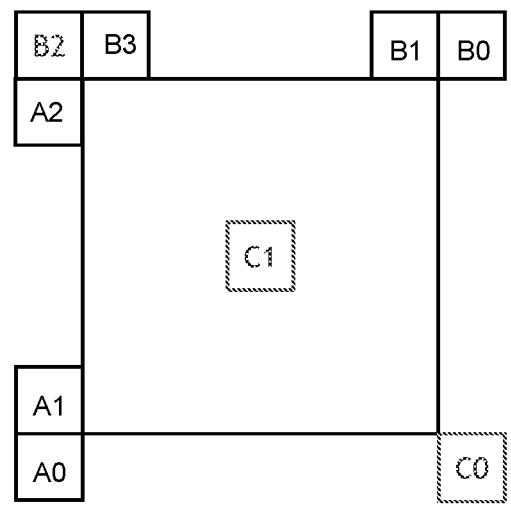
FIG. 8 illustrates positions for spatial and temporal predictors.

In VVC, predictor lists are present in different inter coding modes: regular merge, MMVD (Merge mode with MVD), CIIP (Combined Intra and Inter Prediction), TPM/GEO, IBC (Intra Block Copy), regular AMVP (Advanced Motion Vector Prediction), Affine AMVP, and sub-block merge. These predictor lists contain spatial predictors selected from the spatial neighboring blocks at positions {A0, A1, A2, B0, B1, B2, B3} as shown in FIG. 8. A predictor from a left neighboring block is considered a left spatial predictor, and a predictor from an above neighboring block is considered a top spatial predictor. Some blocks, such as top-left block B2, are considered as both left and top neighboring blocks.

In VTM-6.0 (see "Algorithm description for Versatile Video Coding and Test Model 6 (VTM 6)", JVET-O2002, 15th Meeting: Gothenburg, SE, 3-12 Jul. 2019), the spatial candidates of every list are scanned generally from left to top. For example, for the regular merge mode, the first spatial predictor is from A1 (left), and the second spatial predictor is from B1 (top) if it is different from A1 predictor. For the regular AMVP mode, the first spatial predictor is selected from A0 or A1 (left), and the second spatial predictor is from B0, B1 or B2 (top). The different lists are described in Table 1.

TABLE 1

VTM-6.0 list of predictor candidates (cand) in each coding mode

| List | Regular Merge | MMVD | Triangle |
|---|---|---|---|
| Cand | Spatial A1<br>Spatial B1 + pruned A1<br>Spatial B0 + pruned B1<br>Spatial A0 + pruned A1<br>Spatial B2 + pruned A1/B1<br>TMVP C0/C1<br>HMVP last to first + 2 first pruned A1/B1 + let one space for pairwise<br>Pairwise of cand {0, 1}<br>Fulfill with zero | Same as merge<br>Pick first two | Same as merge<br>Unidir part of merge cand |

| List | IBC | Regular AMVP |
|---|---|---|
| Cand | Spatial A1<br>Spatial B1 + pruned A1<br>HMVP last to first +<br>2 first pruned A1/B1<br>Fulfill with zero | Spatial unscaled A0/A1<br>Spatial unscaled B0/B1/B2<br>Rounding AMVR + ¼-pel<br>Pruned spatial cand<br>TMVP C0/C1 + rounding AMVR + ¼-pel<br>HMVP first to last + rounding AMVR + ¼-pel<br>Fulfill with zero |

| List | Affine AMVP | Sub-block merge |
|---|---|---|
| Cand | Spatial inherited Affine A0/A1 + rounding AMVR + ¼-pel<br>Spatial inherited Affine B0/B1/B2 + rounding AMVR + ¼-pel<br>Spatial LT unscaled B2/B3/A2 + rounding AMVR + ¼-pel<br>Spatial RT unscaled B1/B0 + rounding AMVR + ¼-pel<br>Spatial LB unscaled A1/A0 + rounding AMVR + ¼-pel<br>Virtual Affine with {LT, RT, LB}/{LT, RT}<br>Translational with LB, RT, LT<br>Translational with TMVP C0/C1<br>Fulfill with zero Affine | Spatial A1<br>SbTMVP<br>Spatial inherited Affine A0/A1<br>Spatial inherited Affine B0/B1/B2<br>Spatial LT B2/B3/A2<br>Spatial RT B1/B0<br>Spatial LB A1/A0<br>TMVP RB C0<br>Constructed Affine {LT, RT, LB},<br>{LT, RT, RB},<br>{LT, LB, RB},<br>{RT, LB, RB},<br>{LT, RT}, {LT, LB}<br>Fulfill with zero Affine |

Regular Merge Mode

In VTM-6.0, the predictor list for the regular merge mode, also referred to as the merge candidate list, the merge list or the regular merge list, is constructed by including the following types of predictors (also referred to as candidates):
1) Spatial MVPs (Motion Vector Predictors) from spatial neighbour CUs;
2) Temporal MVP from collocated CUs;
3) History-based MVPs from a FIFO table;
4) Pairwise average MVP; and
5) Zero MVPs.

For each CU coded in the merge mode, the index of the selected predictor is encoded. The generation process of each category of merge candidates is described below.

Spatial Candidates Derivation

The derivation of spatial merge candidates in VVC is the same as in HEVC. A maximum of four merge candidates are selected among candidates located in the positions depicted in FIG. 8. The order of derivation is $A_1$, $B_1$, $B_0$, $A_0$ and $B_2$. Position $B_2$ is considered only when any CU of position $A_1$, $B_1$, $B_0$, $A_0$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the redundancy check. Instead, only the pairs as in Table 1 are considered and a candidate is only added to the list if the corresponding candidate used for redundancy check has not the same motion information. For example, in Table 1, "Spatial B1+pruned A1" indicates that candidate at position $B_1$ is added to the merge list only if different from candidate at position $A_1$.

Temporal Candidate Derivation ("TMVP C0/C1")

Only one temporal candidate is added to the merge list. Particularly, in the derivation of this temporal merge candidate, a scaled motion vector is derived based on co-located CU belonging to the collocated reference picture. The position for the temporal candidate is selected between candidates $C_0$ and $C_1$, as depicted in FIG. 8. If CU at position $C_0$ is not available, is intra coded, or is outside of the current row of CTUs, position $C_1$ is used. Otherwise, position $C_0$ is used in the derivation of the temporal merge candidate.

History-Based Merge Candidates Derivation

The history-based MVP (HMVP) merge candidates are added to the merge list after the spatial MVP and TMVP. To use HMVP, the motion information of a previously coded block is stored in a table and used as MVP for the current CU. The table with multiple HMVP candidates is maintained during the encoding/decoding process. The table is reset (emptied) when a new CTU row is encountered. Whenever there is a non-sub-block inter-coded CU, the associated motion information is added to the last entry of the table as a new HMVP candidate.

HMVP candidates could be used in the merge candidate list construction process. The latest several HMVP candidates in the table are checked in order and inserted to the candidate list after the TMVP candidate. Redundancy check is applied on the HMVP candidates to some spatial merge candidate. Each of the two last HMVP candidates in the FIFO (the more recent ones) is compared to spatial candidates $A_1$ and $B_1$ and added to the merge list only if it has not the same motion information. Once the total number of available merge candidates reaches the maximally allowed merge candidates minus 1, the merge candidate list construction process from HMVP is terminated.

Pairwise Average Merge Candidate Derivation

Pairwise average candidate is generated by averaging the first pair of candidates in the existing merge candidate list. When the merge list is not full after pairwise average merge candidate is added, zero MVPs are inserted in the end until the maximum merge candidate number is reached.

Merge Mode with MVD (MMVD)

In addition to merge mode, where the implicitly derived motion information is directly used for prediction samples generation of the current CU, the merge mode with motion vector differences (MMVD) is introduced in VVC.

In MMVD, after a merge candidate is selected, it is further refined by the signaled MVD information. The further information includes a merge candidate flag, an index to specify motion magnitude, and an index for indication of motion direction. In the MMVD mode, one of the first two candidates in the merge list is selected to be used as the MV basis. The merge candidate flag is signaled to specify which one is used.

Triangle Partition for Inter Prediction (TPM)

When the triangle partition mode is used, a CU is split evenly into two triangle-shaped partitions, using either the diagonal split or the anti-diagonal split. Each triangle partition in the CU is inter-predicted using its own motion; only uni-prediction is allowed for each partition. The uni-prediction candidate list is derived directly from the merge candidate list constructed according to the merge mode as described above.

If the triangle partition mode is used for the current CU, then a flag indicating the direction of the triangle partition (diagonal or anti-diagonal), and two merge indices (one for each partition) are further signalled.

Intra Block Copy Mode (IBC)

The Intra Block Copy (IBC) mode comes from the Screen Content extension of HEVC. This mode emulates inter prediction with the decoded current frame. It only supports IBC AMVP and IBC merge modes that are identical to the corresponding regular modes except for the predictor lists that are simpler.

In VVC, the IBC merge predictor list (also referred to as the IBC merge candidate list or the IBC merge list) is constructed by including the following types of candidates:
1) Spatial MVPs from spatial neighbour CUs;
2) History-based MVPs from an IBC FIFO table; and
3) Zero MVPs.

Spatial Candidates Derivation

The derivation of spatial IBC merge candidates is the same as in regular merge. A maximum of only two spatial IBC merge candidates are selected among candidates located in the positions $A_1$, $B_1$. After candidate at position $A_1$ is added, the addition of the remaining candidate is subject to a redundancy check, which ensures that candidates with the same motion information are excluded from the list so that coding efficiency is improved.

History-Based Merge Candidates Derivation

The history-based MVP (HMVP) IBC merge candidates are added to IBC merge list after the spatial IBC MVP in the same way as for the regular merge list. But a separate FIFO is used for IBC mode.

When the IBC merge list is not full after HMVP candidates are added, zero IBC MVPs are inserted in the end until the maximum IBC merge candidate number is reached.

In IBC AMVP mode, since the only available reference frame is the current one, only one predictor list has to be constructed. Such a predictor list reuses the IBC merge list restricted to two candidates without pruning.

Regular AMVP Mode

The AMVP mode (also called regular AMVP) of VVC is close to the one of HEVC. A predictor list for the AMVP mode, also referred to as the AMVP candidate list, the AMVP list, or the regular AMVP list, is constructed for each reference frame of each reference frame list by including the following types of candidates:
1) Spatial MVs from spatial neighbour CUs;
2) Temporal MV from collocated CUs;
3) History-based MVs from a FIFO table; and
4) Zero MVs.

The precision of the motion storage ($\frac{1}{16}$-pel) is finer than the allowed precision for motion vector difference, which can be $\frac{1}{4}$-pel, $\frac{1}{2}$-pel, 1-pel or 4-pel depending on the AMVR (Adaptive Motion Vector Resolution) mode. To respect such constraint, each predictor is rounded to the allowed precision for the motion vector difference.

For each CU coded in the AMVP mode and for each reference frame list, the index of the selected reference frame, the index of the selected predictor (also referred to as the AMVP candidate) and the motion vector differential (as the difference between the selected motion vector estimated through motion estimation and the predictor) are encoded. The generation process of each category of AMVP candidates is described below for a reference frame x, denoted $ref_{xy}$, of a reference frame list y.

Spatial Candidates Derivation

The derivation of spatial AMVP candidates for $ref_{xy}$ in VVC is the same as that in HEVC. A maximum of two AMVP candidates are selected among candidates located in the positions depicted in FIG. 8. One candidate is chosen from left positions $A_0$ or $A_1$ and another one from top positions $B_0$, $B_1$ or $B_2$. To be considered, a candidate must also use the reference frame $ref_{xy}$. In particular, when $A_0$ is not inter coded or do not use the reference frame $ref_{xy}$, then left predictor is selected from position $A_1$. After a left candidate is added, the addition of a top candidate is subject to a redundancy check, which ensures that candidates with the same motion vector are excluded from the list so that coding efficiency is improved.

Temporal Candidate Derivation ("TMVP C0/C1")

Only one temporal candidate is added to the AMVP list by using the same derivation process as for the regular merge list construction but restricted to the usage of $ref_{xy}$.

History-Based Candidates Derivation

Several HMVP candidates in the FIFO table are checked in reverse order and inserted to the candidate list after the TMVP candidate if using $ref_{xy}$ and without redundancy check. Once the total number of available AMVP candidates reaches the maximally allowed AMVP candidates, the AMVP candidate list construction process from HMVP is terminated.

When the AMVP list is not full after HMVP candidates are added, zero MVs are inserted in the end until the maximum AMVP candidate number is reached.

Affine AMVP Mode

Figure 9:
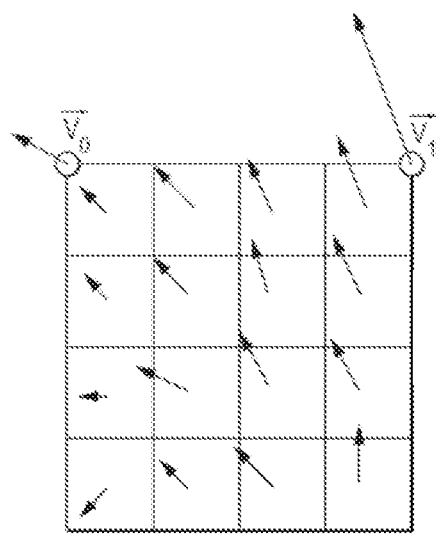
FIG. 9 illustrates an example of 4×4 sub-CU based affine motion vector field used in VVC.

The affine AMVP, a sub-block mode, is close to the regular AMVP but uses affine motion model as presented in FIG. 9 instead of a translational one.

A flag signals that the AMVP mode is affine and another flag indicates whether 4- or 6-parameter affine model is used. Then, for each reference frame list, the index of the selected reference frame, the index of the selected predictor (also referred to as the affine AMVP candidate) and two motion vector differentials (as the differences between the best CPMVs estimated through affine motion estimation and the CPMV predictors) are encoded.

The predictor is selected in a predictor list which is constructed for each reference frame of each reference frame list by including the following types of candidates:
1) Spatial inherited affine CPMVs (Control Point Motion Vectors) from spatial affine neighbour CUs;
2) Constructed affine CPMVs from spatial neighbour CUs;
3) Constructed translational CPMVs from spatial and temporal neighbour CUs; and
4) Zero affine CPMVs.

The precision of the motion storage (1/16-pel) is finer than the allowed precision for motion vector differences which can be 1/16-pel, 1/4-pel or 1-pel depending on the AMVR (Adaptive Motion Vector Resolution) mode. To respect such constraint, each predictor is rounded to the allowed precision for the motion vector differences.

Spatial Inherited Affine Candidates Derivation

Figure 10:
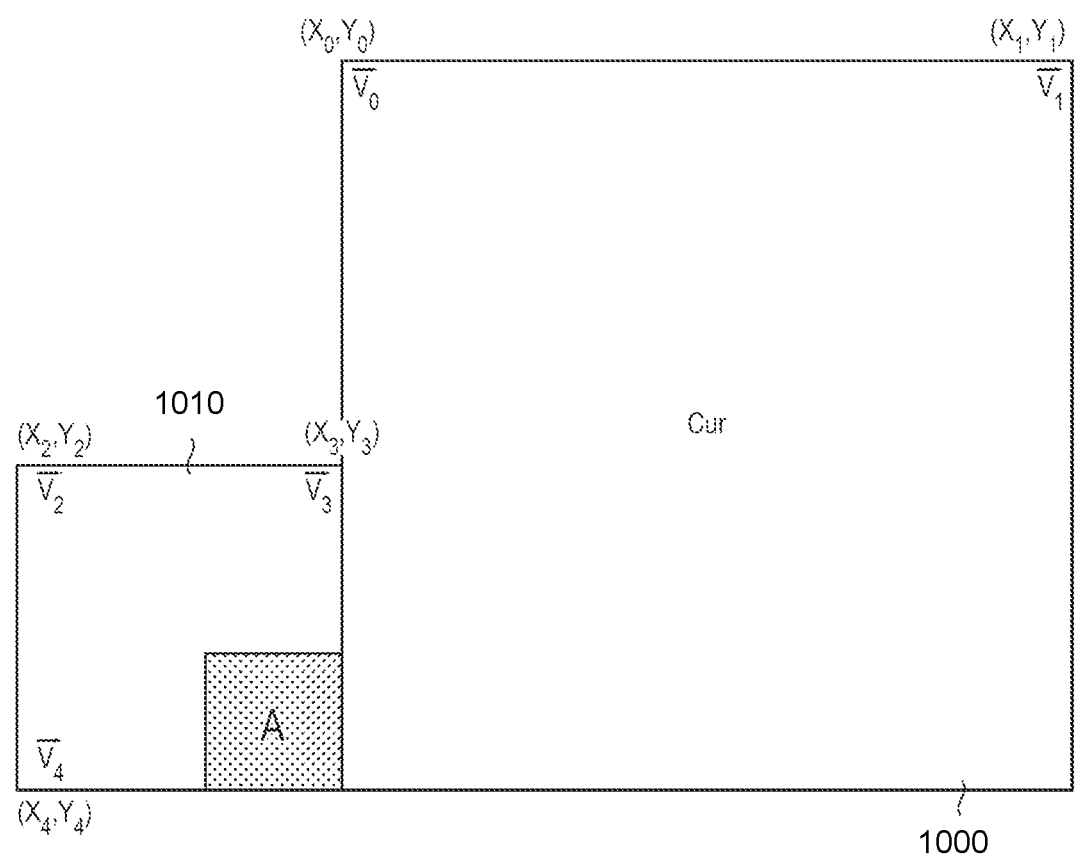
FIG. 10 illustrates an example of affine model inheritance.

The derivation of spatial inherited affine candidates for a reference frame $ref_{xy}$ in VVC is based on affine candidates located in the positions depicted in FIG. 10. One candidate is chosen in left positions $A_0$, $A_1$ and another in top positions $B_0$, $B_1$, $B_2$. To be considered, a candidate must be affine coded and also use the reference frame $ref_{xy}$.

The affine model (CPMVs) for the current CU is derived from the stored model of the considered affine neighbor.

Constructed Affine Candidate Derivation

One affine model is constructed by extracting CPMVs from top-left (LT) positions ($A_2$, $B_2$, $B_3$), bottom-left (LB) positions ($A_0$, $A_1$) and top-right (RT) positions ($B_0$, $B_1$) that uses $ref_{xy}$. Then the current affine model is defined as the combinations of these extracted CPMVs.

Constructed Translational Candidates Derivation

When the affine AMVP list is not full after constructed affine candidate is added, translational models are inserted into the list. All CPMVs of the current affine model are successively set to the translational motion vector from top, left, top-left and temporal positions.

When the affine AMVP list is not full after that, zero CPMVs are inserted in the end until the maximum affine AMVP candidate number is reached.

Sub-Block Merge Mode

The sub-block merge mode includes two different sets of predictor candidates: SbTMVP and affine merge. For affine AMVP mode, a flag signals that the merge mode is sub-block. Then, as for regular merge mode, for each CU coded in sub-block merge mode, the index of the selected predictor is encoded.

The predictor list for the sub-block merge mode, also referred to as the sub-block merge candidate list or the affine merge list, is constructed by including the following types of candidates:

1) SbTMVP candidate;
2) Spatial inherited affine CPMVs from spatial affine neighbour CUs;
3) Constructed affine CPMVs from spatial and temporal neighbor CUs; and
4) Zero CPMVs.

Sub-Block Temporal Motion Vector Predictor (SbTMVP) Derivation

Figure 11:
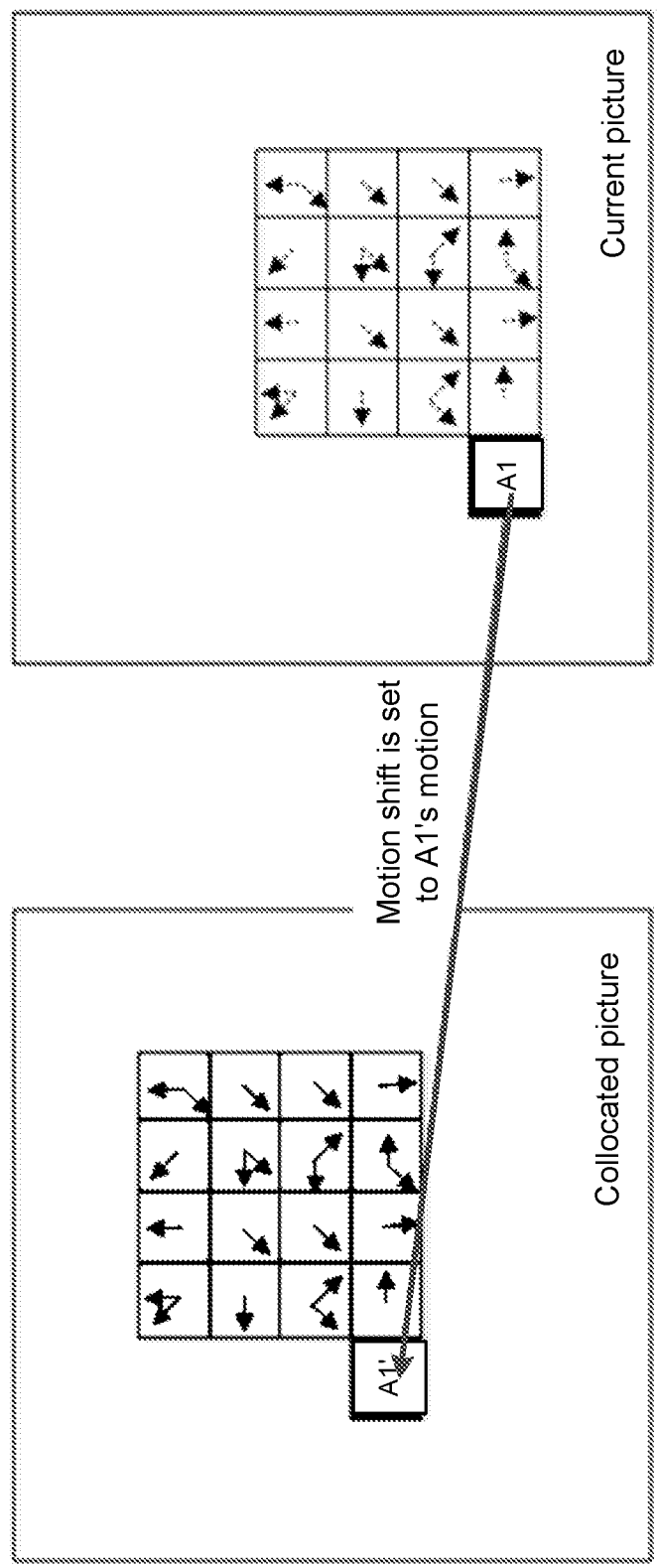
FIG. 11 illustrates an example of SbTMVP prediction.
Figure 12:
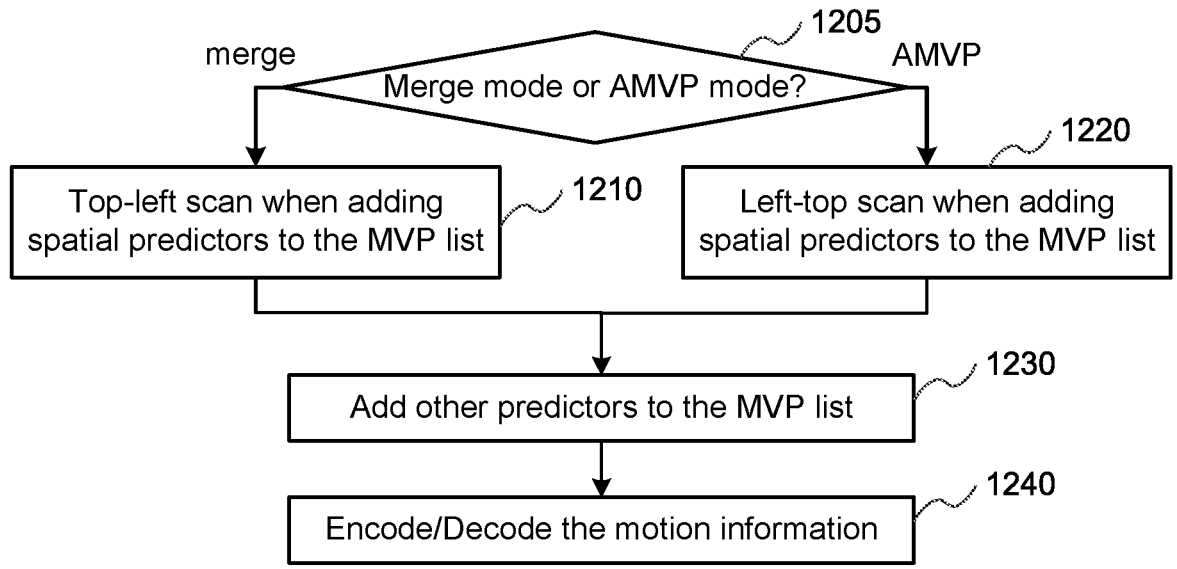
FIG. 12 illustrates a method of adjusting the spatial predictor scan order based on whether the coding mode is the merge mode or the AMVP mode, according to an embodiment.
Figure 13:
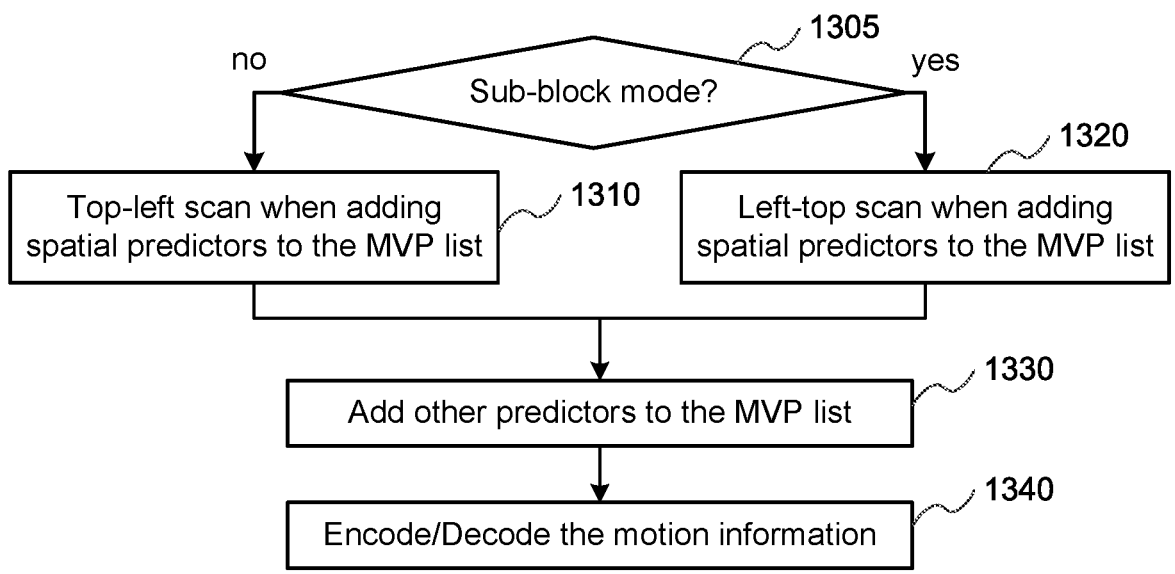
FIG. 13 illustrates a method of adjusting the spatial predictor scan order based on whether the coding mode is a sub-block mode, according to an embodiment.

The SbTMVP candidate uses the left spatial candidate $A_1$ as input (or a zero MV if $A_1$ is not available). This input motion vector is used on the collocated reference frame to retrieve motion information for the current CU on a 8×8 basis as shown in FIG. 11.

Spatial Inherited Affine Candidates Derivation

The derivation of spatial inherited affine candidates is the same as for affine AMVP mode where the affine model (CPMVs) for the current CU is derived from the stored model of the left then top affine neighbors.

Constructed Affine Candidate Derivation

Affine models are constructed by extracting CPMVs from top-left positions ($A_2$, $B_2$, $B_3$), left positions ($A_0$, $A_1$), top positions ($B_0$, $B_1$) and temporal $C_0$ position. Then the current affine model is defined as combinations of these extracted CPMVs.

When the sub-block merge list is not full after that, zero CPMVs are inserted in the end until the maximum sub-block merge candidate number is reached.

In VTM-7.0 (see "Algorithm description for Versatile Video Coding and Test Model 7 (VTM 7)", NET-P2002, 16th Meeting: Geneva, CH, 1-11 Oct. 2019), a top-left scanning has been adopted for the regular merge, MMVD and TPM/GEO modes, and the left-top scanning is kept for the other coding modes as shown in Table 2. For the regular merge mode, the difference in the merge list construction is described in Table 3.

TABLE 2

VTM-7.0 modified list of predictor candidates

| List | Merge | MMVD | Triangle |
|---|---|---|---|
| Cand | Spatial B1<br>Spatial A1 + pruned B1<br>Spatial B0 + pruned B1<br>Spatial A0 + pruned A1<br>Spatial B2 + pruned A1/B1<br>TMVP C0/C1<br>HMVP last to first + 2 first pruned A1/B1 + let one space for pairwise<br>Pairwise of cand {0, 1}<br>Fulfill with zero | Same as merge<br>Pick first two | Same as merge<br>Unidir part of merge cand |

TABLE 3 differences between VTM-6.0 and VTM-7.0 regular merge list

| VTM-6.0 | VTM-7.0 |
|---|---|
| Spatial A1 | Spatial B1 |
| Spatial B1 + pruned A1 | Spatial A1 + pruned B1 |
| Spatial B0 + pruned B1 | Spatial B0 + pruned B1 |
| Spatial A0 + pruned A1 | Spatial A0 + pruned A1 |
| Spatial B2 + pruned A1/B1 | Spatial B2 + pruned A1/B1 |
| TMVP C0/C1 | TMVP C0/C1 |
| HMVP last to first + 2 first pruned A1/B1 + let one space for pairwise | HMVP last to first + 2 first pruned A1/B1 + let one space for pairwise |
| Pairwise of cand {0, 1} | Pairwise of cand {0, 1} |
| Fulfill with zero | Fulfill with zero |

The top-left scanning of the VTM-7.0 only affects the merge, MMVD and Triangle modes. It is thus possible to extend this concept of top-left scanning to all other coding modes as IBC, AMVP, affine AMVP and sub-block merge modes. In one embodiment, it is proposed to consider a top-left scanning of spatial predictors in every applicable coding mode.

Extend to IBC

It is proposed to use a top-left scanning of the spatial predictors for IBC list construction as presented in Table 4. As shown in Table 4, the spatial predictor B1 is considered before spatial predictor A1 in the predictor list construction. This will affect IBC merge and IBC AMVP since both modes use the same list.

TABLE 4 top-left scanning extension to IBC list

| List | IBC |
|---|---|
| Candidates | Spatial B1<br>Spatial A1 + pruned B1<br>HMVP last to first + 2 first pruned A1/B1 |

TABLE 4-continued

| | top-left scanning extension to IBC list |
|---|---|
| List | IBC |
| | Fulfill with zero |

Extend to Regular AMVP

In the AMVP case, a set of spatial neighbors are explored. But in VTM-7.0, the left set is scanned before the top one. It is thus proposed to explore the top positions (B0/B1/B2) before the left ones (A0/A1) as shown in Table 5.

TABLE 5

| | top-left scanning extension to regular AMVP list |
|---|---|
| List | AMVP |
| Candidates | Spatial unscaled B0/B1/B2<br>Spatial unscaled A0/A1<br>Rounding AMVR + ¼-pel<br>Pruned spatial cand<br>TMVP C0/C1 + rounding AMVR + ¼-pel<br>HMVP first to last + rounding AMVR + ¼-pel<br>Fulfill with zero |

In a variant, it is also possible to move B2, i.e., the top-left candidate, in the set of left candidates as presented in Table 6.

TABLE 6

| | top-left scanning extension to regular<br>AMVP list with B2 as left candidates |
|---|---|
| List | AMVP |
| Candidates | Spatial unscaled B0/B1<br>Spatial unscaled A0/A1/B2<br>Rounding AMVR + ¼-pel<br>Pruned spatial cand<br>TMVP C0/C1 + rounding AMVR + ¼-pel<br>HMVP first to last + rounding AMVR + ¼-pel<br>Fulfill with zero |

Extend to Affine AMVP

In affine AMVP, the same left set of candidates are explored before top one as for the AMVP case. It is also possible to revert the order of scanning as presented in Table 7.

TABLE 7

| | top-left scanning extension to affine AMVP list |
|---|---|
| List | Affine AMVP |
| Candidates | Spatial inherited Affine B0/B1/B2 +<br>rounding AMVR + ¼-pel<br>Spatial inherited Affine A0/A1 + rounding AMVR + ¼-pel<br>Spatial LT unscaled B2/B3/A2 + rounding AMVR + ¼-pel<br>Spatial RT unscaled B1/B0 + rounding AMVR + ¼-pel<br>Spatial LB unscaled A1/A0 + rounding AMVR + ¼-pel<br>Virtual Affine with {LT, RT, LB}/{LT, RT}<br>Translational with LB, RT, LT<br>Translational with TMVP C0/C1<br>Fulfill with zero Affine |

In a variant, it is also possible to move the B2, i.e., the top-left candidate, in the set of left candidates as presented in Table 8.

TABLE 8

| | top-left scanning extension to affine<br>AMVP list with B2 as left candidates |
|---|---|
| List | Affine AMVP |
| Candidates | Spatial inherited Affine B0/B1 + rounding AMVR + ¼-pel<br>Spatial inherited Affine A0/A1/B2 +<br>rounding AMVR + ¼-pel<br>Spatial LT unscaled B2/B3/A2 + rounding AMVR + ¼-pel<br>Spatial RT unscaled B1/B0 + rounding AMVR + ¼-pel<br>Spatial LB unscaled A1/A0 + rounding AMVR + ¼-pel<br>Virtual Affine with {LT, RT, LB}/{LT, RT}<br>Translational with LB, RT, LT<br>Translational with TMVP C0/C1<br>Fulfill with zero Affine |

Extend to Sub-Block Merge

The sub-block merge list consists, in the VTM-7.0, in 5 candidates of different nature. It can be a SbTMVP candidate, an inherited or a constructed affine model. The proposed top-left scanning of spatial candidates can be extended to the inherited affine model derivation as presented in Table 9.

TABLE 9

| | top-left scanning extension to sub-block merge list |
|---|---|
| List | Sub-block merge |
| Candidates | Spatial A1<br>SbTMVP<br>Spatial inherited Affine B0/B1/B2<br>Spatial inherited Affine A0/A1<br>Spatial LT B2/B3/A2<br>Spatial RT B1/B0<br>Spatial LB A1/A0<br>TMVP RB C0<br>Constructed Affine<br>{LT, RT, LB}, {LT, RT, RB}, {LT, LB, RB},<br>{RT, LB, RB}, {LT, RT}, {LT, LB}<br>Fulfill with zero Affine |

In a variant, it is also possible to move the B2, i.e., the top-left candidate, in the set of left candidates as presented in Table 10.

TABLE 10

| | top-left scanning extension to sub-block<br>merge list with B2 as left candidates |
|---|---|
| List | Sub-block merge |
| Cand | Spatial A1<br>SbTMVP<br>Spatial inherited Affine B0/B1<br>Spatial inherited Affine A0/A1/B2<br>Spatial LT B2/B3/A2<br>Spatial RT B1/B0<br>Spatial LB A1/A0<br>TMVP RB C0<br>Constructed Affine<br>{LT, RT, LB}, {LT, RT, RB}, {LT, LB, RB},<br>{RT, LB, RB}, {LT, RT}, {LT, LB}<br>Fulfill with zero Affine |

In another variant, the modification can also affect the SbTMVP candidate by using the spatial top candidate as input instead of the left one as shown in Table 11.

TABLE 11 top-left scanning extension to sub-
block merge list including SbTMVP

| List | Sub-block merge |
|---|---|
| Candidates | Spatial B1 |
| | SbTMVP |
| | Spatial inherited Affine B0/B1/B2 |
| | Spatial inherited Affine A0/A1 |
| | Spatial LT B2/B3/A2 |
| | Spatial RT B1/B0 |
| | Spatial LB A1/A0 |
| | TMVP RB C0 |
| | Constructed Affine |
| | {LT, RT, LB}, {LT, RT, RB}, {LT, LB, RB}, |
| | {RT, LB, RB}, {LT, RT}, {LT, LB} |
| | Fulfill with zero Affine |

In the above, it is proposed to use the top-left scanning of spatial neighbors in all coding modes. In another embodiment, it is proposed to apply this order only for a subset of coding modes.

As described above, there are generally two categories of coding modes when a motion vector predictor list is used: the merge mode and AMVP mode. For a coding unit using the merge mode, a predictor list is generated and an index into the list (e.g., mvp_idx) is transmitted to the decoder, and the decoder can generate the same predictor list and select a motion vector predictor as the motion vector for the current coding unit based just on the decoded index of the selected motion vector predictor. Typically, no other motion information such as reference picture index (ref_idx) or motion vector difference (MVD) needs to be transmitted.

For a coding unit using the AMVP mode, a predictor list is generated and an index into the list (e.g., mvp_idx) is transmitted to the decoder. In addition, other motion information such as reference picture index (ref_idx) and motion vector difference (MVD) is also transmitted. The decoder can generate the same predictor list and select a motion vector predictor from the predictor list as the motion vector predictor for the current coding unit, and then decode the motion vector based on the motion vector predictor, the decoded MVD and reference picture index.

In VVC, MMVD is usually considered as a merge mode, but signals the MVD information.

In one embodiment, we propose to use top-left scan (1210, e.g., a top spatial predictor is the first predictor in the predictor list, followed by a left spatial predictor) for all coding units with merge modes (1205, e.g., regular merge, MMVD, TPM, IBC, sub-block merge), and to use left-top scan (1220, e.g., a left spatial predictor is the first predictor in the predictor list, followed by a top spatial predictor) for all coding units with AMVP modes (1205, e.g., regular AMVP, affine AMVP). Other predictors can also be added (1230) to the predictor list. After the predictor list is constructed, the motion information can be encoded or decoded (1240) based on the predictor list. Note it can also be the contrary with top-left for AMVP modes and left-top for merge modes.

In another way of categorization, the coding modes when a motion vector predictor list is used can be categorized as non-sub-block modes and sub-block modes. In a sub-block mode, while the coding mode is indicated at the coding unit level, motion compensation is performed at the sub-block level and sub-blocks of a CU can have different motion vectors. In VVC there are only affine candidates (from affine AMVP or sub-block merge) and SbTMVP candidates. But it can include other potential sub-block tools as FRUC (Frame Rate Up Conversion) and OBMC (Overlapped Block Motion Compensation).

In one embodiment, we propose to use top-left scan (1310, e.g., a top spatial predictor is the first predictor in the predictor list, followed by a left spatial predictor) for all coding units with non-sub-block modes (1305, e.g., merge, MMVD, TPM, IBC, AMVP), and to use left-top scan (1320, e.g., a left spatial predictor is the first predictor in the predictor list, followed by a top spatial predictor) for all coding units with sub-block modes (1305, affine AMVP, sub-block merge). Other predictors can also be added (1330) to the predictor list. After the predictor list is constructed, the motion information can be encoded or decoded (1340) based on the predictor list. Note it can also be the contrary with top-left for sub-block modes and left-top for non-sub-block modes.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion estimation and compensation modules (270, 275, 375), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein, for example, syntax used to indicate the RST kernel index and to indicate whether the planar intra prediction mode is used or not, are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding, comprising:
  accessing a block of a picture in a video sequence;
  generating a list of motion vector predictors for said block,
  wherein said block is to be encoded by using one of a plurality of coding modes,
  wherein said plurality of coding modes correspond to all available non-sub-block coding modes that use a motion vector predictor list or all available sub-block coding modes that use a motion vector predictor list;
  wherein said list of motion vector predictors includes a plurality of spatial predictors,
  wherein, for each of said plurality of coding modes, the first spatial predictor in said list is from a top neighboring block, and the second spatial predictor following the first spatial predictor is from a left neighboring block; and
  encoding a motion vector associated with said block based on said list of motion vector predictors.

2. The method of claim 1, wherein another plurality of coding modes are available to be used by said block, wherein said another plurality of coding modes correspond to the other ones of all the available non-sub-block coding modes and all the available sub-block coding modes, and wherein, for each mode in said another plurality of coding modes, the first spatial predictor in said list is from said left neighboring block, and the second spatial predictor following the first spatial predictor is from said top neighboring block.

3. A method for video decoding, comprising:
  generating a list of motion vector predictors for a block of a picture in a video sequence,
  wherein said block is to be decoded by using one of a plurality of coding modes,
  wherein said plurality of coding modes correspond to all available non-sub-block coding modes that use a motion vector predictor list or all available sub-block coding modes that use a motion vector predictor list;
  wherein said list of motion vector predictors includes a plurality of spatial predictors,
  wherein, for each of said plurality of coding modes, the first spatial predictor in said list is from a top neighboring block, and the second spatial predictor following the first spatial predictor is from a left neighboring block; and decoding a motion vector associated with said block based on said list of motion vector predictors.

4. The method of claim 3, wherein another plurality of coding modes are available to be used by said block, wherein said another plurality of coding modes correspond to the other ones of all the available non-sub-block coding modes and all the available sub-block coding modes, and wherein, for each mode in said another plurality of coding modes, the first spatial predictor in said list is from said left neighboring block, and the second spatial predictor following the first spatial predictor is from said top neighboring block.

5. An apparatus for video encoding, comprising at least one memory and one or more processors, wherein said one or more processors are configured to:

access a block of a picture in a video sequence;

generate a list of motion vector predictors for said block, wherein said block is to be encoded by using one of a plurality of coding modes, wherein said plurality of coding modes correspond to all available non-sub-block coding modes that use a motion vector predictor list or all available sub-block coding modes that use a motion vector predictor list;

wherein said list of motion vector predictors includes a plurality of spatial predictors, wherein, for each of said plurality of coding modes, the first spatial predictor in said list is from a top neighboring block, and the second spatial predictor following the first spatial predictor is from a left neighboring block; and encode a motion vector associated with said block based on said list of motion vector predictors.

6. The apparatus of claim 5, wherein another plurality of coding modes are available to be used by said block, wherein said another plurality of coding modes correspond to the other ones of all the available non-sub-block coding modes and all the available sub-block coding modes, and wherein, for each mode in said another plurality of coding modes, the first spatial predictor in said list is from said left neighboring block, and the second spatial predictor following the first spatial predictor is from said top neighboring block.

7. An apparatus for video decoding, comprising at least one memory and one or more processors, wherein said one or more processors are configured to:

generate a list of motion vector predictors for a block of a picture in a video sequence, wherein said block is to be decoded by using one of a plurality of coding modes, wherein said plurality of coding modes correspond to all available non-sub-block coding modes that use a motion vector predictor list or all available sub-block coding modes that use a motion vector predictor list;

wherein said list of motion vector predictors includes a plurality of spatial predictors, wherein, for each of said plurality of coding modes, the first spatial predictor in said list is from a top neighboring block, and the second spatial predictor following the first spatial predictor is from a left neighboring block; and decode a motion vector associated with said block based on said list of motion vector predictors.

8. The apparatus of claim 7, wherein another plurality of coding modes are available to be used by said block, wherein said another plurality of coding modes correspond to the other ones of all the available non-sub-block coding modes and all the available sub-block coding modes, and wherein, for each mode in said another plurality of coding modes, the first spatial predictor in said list is from said left neighboring block, and the second spatial predictor following the first spatial predictor is from said top neighboring block.

* * * * *